United States Patent [19]

Heidorn

[11] 3,754,626
[45] Aug. 28, 1973

[54] VACUUM ACTUATED CLUTCH
[75] Inventor: John H. Heidorn, Dayton, Ohio
[73] Assignee: General Motors Corporation, Detroit, Mich.
[22] Filed: Aug. 22, 1972
[21] Appl. No.: 282,834

[52] U.S. Cl. .................. 192/38, 192/45, 192/47, 192/78, 192/85 V, 192/93 C, 417/319, 417/223
[51] Int. Cl. ................ F16d 15/00, F16d 25/12
[58] Field of Search ............... 192/38, 45, 47, 85 V, 192/78, 93 C

[56] References Cited
UNITED STATES PATENTS
714,083  11/1902  Wolfe ........................... 192/78 X
2,637,308  5/1953  Dodge ......................... 192/85 V X Primary Examiner—Allan D. Herrmann
Attorney—F. J. Soucek and C. R. Engle

[57] ABSTRACT

A vacuum actuated clutch including a housing defining a closed space having a movable wall, the wall moving in response to the application of vacuum to the closed space. The movable wall is connected to a stationary wall by an annular flexible member permitting movement of the wall in response to the vacuum. A continuously driven pulley is keyed to a shaft which contains an axially extending aperture slidably receiving a clutch actuating pin having a tapered end while its other end is connected to the movable wall. A one-way clutch assembly including an expandable inner race ring is concentrically disposed about the shaft for selective engagement with a driven member. The shaft contains a diametrically extending aperture in axial alignment with a one-way clutch assembly and contains radially movable pins on either side of the tapered end of the clutch actuating pin. Movement of the clutch actuating pin with the movable wall in response to the application of vacuum to the closed space in turn forces the pins in the diametrically extending aperture radially outwardly expanding the inner race ring of the one-way clutch assembly thereby drivingly engaging the driven member with the shaft.

3 Claims, 3 Drawing Figures

Patented Aug. 28, 1973  3,754,626

VACUUM ACTUATED CLUTCH

This invention relates to a vacuum actuated clutch and more particularly to a vacuum actuated clutch including a movable wall axially reciprocating a clutch actuating pin expanding an inner race ring of a one-way clutch assembly to selectively engage the clutch.

Clutch assemblies as presently known in the art usually involve a complicated structure for selectively energizing the clutch to drivingly connect driving and driven members. The subject invention has particular application in a vehicle air conditioning system wherein a pulley is continously driven by the vehicle engine and consequently continuously drives an air conditioning compressor shaft keyed to the pulley. Engine vacuum is utilized to provide the energy required to accomplish actuation of the clutch assembly and connect the continuously rotating shaft with a driven element of the air conditioning compressor. The clutch actuating assembly, which can be relatively conveniently added to the exposed end of the driving pulley assembly, includes a movable wall responsive to the application of vaccum to a closed space between the wall and the exterior surface of the pulley assembly. An annular flexible member is secured to the peripheral surfaces of the pulley and the movable wall thereby defining the closed space. The air conditioning compressor shaft is provided with an axially extending bore therethrough which slidably receives a clutch actuating pin attached to the moving wall. A one-way clutch assembly is positioned in axial alignment with a driven member of the compressor so that axial movement of the actuating pin, including a tapered surface thereof, is operative to expand an inner ring of the one-way clutch assembly thereby locking the continuously rotating shaft to the driven element as desired.

A general object of the subject invention is the provision of a relatively simple clutch actuating device utilizing a controled source of vacuum to effect actuation of a clutch assembly.

Another object of the subject invention is the provision of a vacuum responsive member effective to expand an inner ring of a one-way clutch assembly outwardly providing initial lock up of the one-way clutch assembly connecting a driven member with a continuously rotating shaft.

Another object of the subject invention is the provision of a vacuum responsive member actuating a clutch engaging member to initially energize a one-way clutch assembly whereby further relative rotation between the respective members positively couples the driving member with the driven member.

A still further object of the subject invention is the provision of a vacuum actuated wall partially defining a closed space that is selectively movable to extend a clutch actuating pin slidably positioned within a bore in the shaft and having a tapered end operative to expand radially movable pins that in turn expand in the inner ring of a one-way clutch assembly thereby locking the driven shaft with a driven member.

The novel features which I believe to be characteristic of my invention are set forth with particularity in the appended claims. My invention itself, however, both as to its organization and method of operation, may be best understood by reference to the following description taken in conjunction with the accompanying drawings in which:

Figure 1:
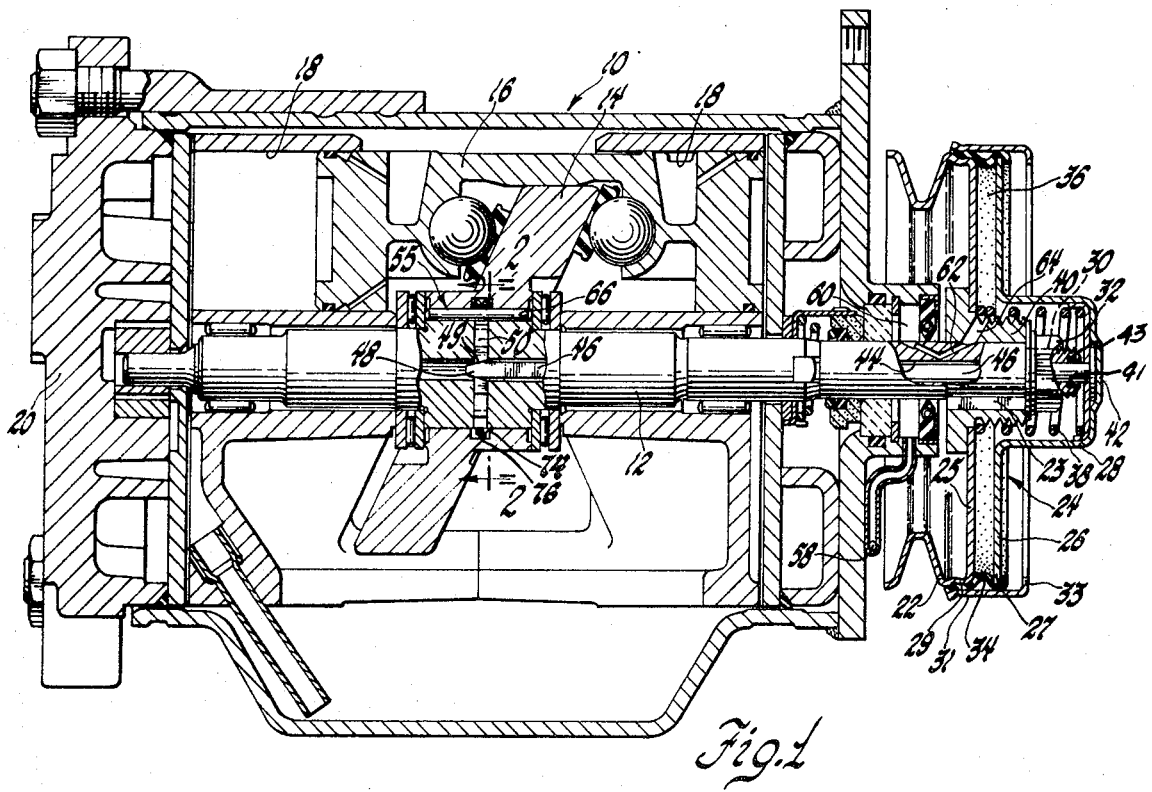
FIG. 1 is a cross-sectional view illustrating the structure of the subject invention in association with a vehicle air conditioning compressor.

Referring now to the drawings, a vehicle air compressor assembly 10 is shown including a shaft 12 selectively drivingly connected to a swash plate 14 which when rotated by the shaft 12 reciprocates dual piston assemblies 16 within cylinders 18 compressing refrigerant for discharge through an end plate 20 for use in a vehicle air conditioning system. The compressor shaft 12 has a pulley assembly 22 mounted thereon and is secured by a key 23 for rotation therewith. The pulley assembly 22 is continuously driven by the vehicle engine. A clutch actuating assembly 24 includes an axially movable metal wall 26 containing a cup-shaped portion 28 receiving a threaded end 30 with a nut 32 threadably mounted thereon retaining the pulley 22 on the shaft 12. An annular flexible seal 34 is connected to the peripheral edge 27 of wall 26 and also to the peripheral edge 29 of the pulley assembly 22. A metal cylindrical member 31 can be secured to peripheral edge 29 of pulley 22 and be formed to include a laterally extending portion 33 limiting outward movement of the metal wall 26 as it is biased to its normal position by a spring 38. The exterior wall 25 of pulley 22, the metal wall 26 and the flexible annular member 34 all cooperate to form a fluid tight chamber 36 therebetween. The spring 38 is concentrically positioned about the nut 34 and a hub portion 40 of the pulley 22 to continuously bias the wall to its aforementioned normal position away from the pulley 22. The shaft 12 is provided with an axial bore 44 receiving an elongated clutch actuating pin 46 terminating in a tapered end 48 providing cam surfaces 49. The elongated pin 46 is secured to end wall 42 of the cup portion 28 of movable wall 26. The shaft 12 contains a groove 41 receiving an O-ring seal 43 preventing loss of fluid out of the axial bore 44.

Figure 2:
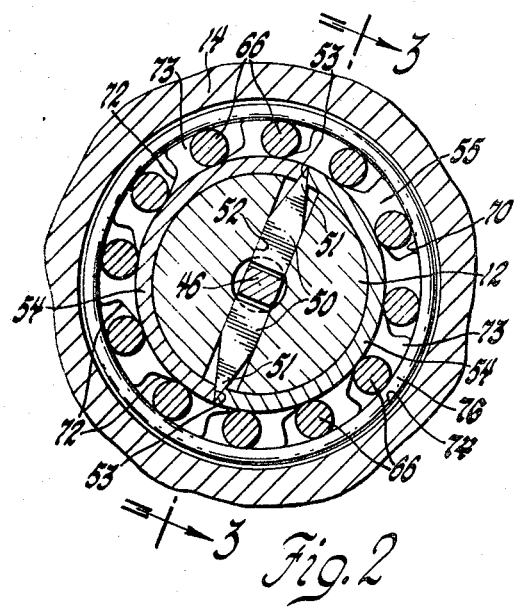
FIG. 2 is an expanded partial cross-sectional view taken on line 2—2 of FIG. 1.
Figure 3:
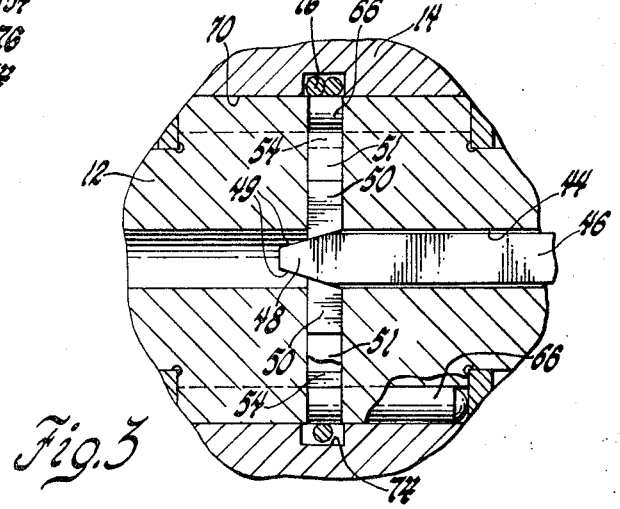
FIG. 3 is a fragmentary cross-sectional view taken on line 3—3 of FIG. 2.

As best illustrated in FIGS. 2 and 3, diametrically opposed radially movable expanding pins 50 are positioned in a diametrical aperture 52 in the shaft 12. The expanding pins 50 terminate in tapered ends 51 received in mating apertures 53 in an inner ring 54 of a one-way clutch assembly 55. The inner race ring 54 of the one-way clutch assembly 55 is expanded when engaged by the radially movable expanding pins 50 and initially energizes the one-way clutch assembly 55 as will be later described in more detail.

The compressor assembly 10 is provided with a conduit 58 which conveys vacuum from a vehicle engine to a cavity 60 which in turn connects with a passage 62 in the compressor housing and an aligned passage 64 in the pulley hub 40 so that the vacuum is supplied to the aforementioned fluid tight chamber or closed space 36. The presence of vacuum in the closed space 36 causes the wall 26 to move in opposition to the force of biasing spring 38 thereby extending the elongated clutch actuating pin 46 within bore 44 engaging its cam surfaces 49 with the expanding pins 50 moving them radially outwardly into tight engagement with expanding ring 54. Expansion of the inner race ring 54 initially engages rollers 66 of the one-way clutch assembly 55 with an outer race member 70. This initial engagement of the rollers 66 with the outer race 70 by virtue of the expansion of inner race ring 54 causes a slight relative rotation between the inner race 54 and the outer race 70 causing the rollers 66 to slightly progress up ramps 72 provided in the spacers 73 located between each of the rollers 66, thereby locking the one-way clutch in an engaged position coupling the continuously rotating shaft 12 with the swash plate 14 and driving the pistons 16 within their respective cylinders 18. The swash plate 14 contains an annular groove 74 containing one or more turns of a coil retractor spring 76 which is effective to contract the rollers 66 away from clutch outer race 70 when pin 46 is retracted in the bore 44. The shaft 12 can be machined with a modified hob to form the specific shaped splines providing the integral spacers 73 as best shown in FIG. 2.

While I have shown and described a specific embodiment of the present invention it will, of course, be understood that various modifications and alternative constructions may be made without departing from the true spirit and scope of this invention. For this reason I intend, therefore, by the appended claims to cover all such arrangements falling within the true spirit and scope of these claims.

I claim:

1. A vacuum actuated clutch effective to form a driving engagement in response to the application of vacuum from a source, said clutch comprising: driving means; a shaft; means defining a closed space adjacent said shaft; said means having flexible wall portions effective to collapse upon application of vacuum providing movement of a wall portion axially relative to said shaft; a driven member mounted for rotation with said shaft; a one-way clutch assembly having an expandable race ring; and means actuated by the axial movement of said wall portion in response to vacuum in said closed space expanding said one-way clutch race ring engaging the one-way clutch to drivingly connect said driving means with said driven member for rotation with said shaft.

2. A vacuum actuated clutch effective to form a driving engagement in response to the application of vacuum from a source, said clutch comprising: driving means; a shaft; means defining a closed space adjacent said shaft; said means having flexible wall portions effective to collapse upon application of vacuum providing movement of a wall portion axially relative to said shaft; a driven member mounted for rotation with said shaft; a one-way clutch assembly having an expandable race ring; said shaft containing an axial bore, a clutch actuating pin slidably received in the shaft bore and having one end connected to said flexible wall portions for axial movement therewith, and means actuated by axial movement of said pin expanding said expandable race ring of said one-way clutch assembly initially engaging the same drivingly connecting said driving means with said driven member.

3. A vacuum actuated clutch effective to form a driving engagement in response to the application of vacuum from a source, said clutch comprising: a driving pulley having an exterior end wall; a shaft secured to said pulley for rotation therewith and extending therethrough, a cup-shaped metal wall conforming to said pulley exterior wall and said shaft extension but being spaced therefrom; an annular flexible member sealingly connecting the outer peripheral edges of said pulley wall and said cup-shaped metal wall defining a closed space; said cup-shaped metal wall moving axially relative to said shaft and flexing said annular member in response to the application of vacuum to said closed space; a one-way clutch assembly concentrically positioned on said shaft; the inner race ring of said one-way clutch being expandable; a driven member; the outer race ring of said one-way clutch connected to said driven member for rotation therewith; said shaft containing a diametrical aperture in axial alignment with said expandable clutch ring; said shaft also containing an axially extending bore therethrough; a clutch actuating pin slidably received in the shaft bore and having one end attached to said cup-shaped metal wall; said pin further having a tapered surface in its other end adjacent the diametrical aperture in said shaft; and expanding pins slidably received in the diametrical aperture on either side of said actuating pin tapered surface whereby axial movement of said metal wall axially moves said actuating pin engaging its tapered surfaces with said expanding pins forcing them radially outwardly expanding said inner ring of said one-way clutch assembly thereby engaging the clutch and connecting said driven member with said shaft.

* * * * *